United States Patent
Neystadt et al.

(10) Patent No.: US 10,163,347 B2
(45) Date of Patent: Dec. 25, 2018

(54) METHOD OF DETECTING AND PROVIDING PARKING SPACE INFORMATION AND/OR ROAD OBSTACLE INFORMATION TO VEHICLES

(71) Applicants: ARM IP LIMITED, Cambridge (GB); ARM LIMITED, Cambridge (GB)

(72) Inventors: John Eugene Neystadt, Kfar-Saba (IL); Hugo John Martin Vincent, Cambridge (GB)

(73) Assignees: ARM IP Limited, Cambridge (GB); ARM Limited, Cambridge (GB)

( * ) Notice: Subject to any disclaimer, the term of this patent is extended or adjusted under 35 U.S.C. 154(b) by 0 days.

(21) Appl. No.: 15/375,565

(22) Filed: Dec. 12, 2016

(65) Prior Publication Data
US 2018/0165962 A1    Jun. 14, 2018

(51) Int. Cl.
*B60Q 1/48* (2006.01)
*G08G 1/14* (2006.01)
*G08G 1/0962* (2006.01)
*G08G 1/16* (2006.01)
*G06K 9/00* (2006.01)

(52) U.S. Cl.
CPC ......... *G08G 1/146* (2013.01); *G06K 9/00805* (2013.01); *G06K 9/00812* (2013.01); *G08G 1/0962* (2013.01); *G08G 1/143* (2013.01); *G08G 1/147* (2013.01); *G08G 1/165* (2013.01)

(58) Field of Classification Search
CPC .................................................. G08G 1/146
See application file for complete search history.

(56) References Cited

U.S. PATENT DOCUMENTS

| | | | | |
|---|---|---|---|---|
| 3,484,002 A * | 12/1969 | Barry | ....................... | B60K 1/00 104/20 |
| 6,266,609 B1 * | 7/2001 | Fastenrath | ......... | G06Q 30/0284 235/384 |
| 6,340,935 B1 * | 1/2002 | Hall | ....................... | G07B 15/04 340/905 |
| 6,694,259 B2 * | 2/2004 | Curbow | ................. | G01C 21/26 340/468 |
| 7,834,778 B2 * | 11/2010 | Browne | ................. | G08G 1/143 340/932.2 |
| 8,422,737 B2 * | 4/2013 | Scherl | ................... | G01S 17/936 348/135 |

(Continued)

*Primary Examiner* — Joseph Feild
*Assistant Examiner* — Rufus Point
(74) *Attorney, Agent, or Firm* — Nixon & Vanderhye P.C.

(57) ABSTRACT

Vehicles which are provided with at least one sensor and a location system, such as a Global Positioning System (GPS) detect parking spaces and/or road obstacles when driving along a road. The detected parking space and/or road obstacle data is transferred to a remote processing module. The processing module may then provide the detected parking space and/or road obstacle data to a requesting vehicle, which is located in the vicinity of the detected parking space and/or road obstacle. In addition, the at least one sensor may detect road data, such as data regarding parking restrictions at the location of the detected parking space. The detected road data may be used to determine whether the detected parking space is available to the requesting vehicle. Furthermore, parking permit data may be used to determine whether the detected parking space is available to the requesting vehicle.

16 Claims, 9 Drawing Sheets

(56) References Cited

U.S. PATENT DOCUMENTS

| | | | | |
|---|---|---|---|---|
| 2001/0039509 A1* | 11/2001 | Dar | .................... | G06Q 20/127 |
| | | | | 705/13 |
| 2002/0161520 A1* | 10/2002 | Dutta | .................... | G01C 21/26 |
| | | | | 701/469 |
| 2003/0074129 A1* | 4/2003 | Curbow | ................. | G01C 21/26 |
| | | | | 701/523 |
| 2004/0015290 A1* | 1/2004 | Curbow | ................. | G01C 21/26 |
| | | | | 701/117 |
| 2006/0220910 A1* | 10/2006 | Becker | ................. | B60Q 9/006 |
| | | | | 340/932.2 |
| 2007/0040701 A1* | 2/2007 | Browne | ................. | G08G 1/14 |
| | | | | 340/932.2 |
| 2010/0302067 A1* | 12/2010 | Goldman | ................. | G08G 1/14 |
| | | | | 340/932.2 |
| 2011/0013201 A1* | 1/2011 | Scherl | ................. | G01S 17/936 |
| | | | | 356/628 |
| 2011/0133957 A1* | 6/2011 | Harbach | ................. | G08G 1/14 |
| | | | | 340/932.2 |
| 2012/0056758 A1* | 3/2012 | Kuhlman | ................. | G08G 1/14 |
| | | | | 340/932.2 |
| 2012/0265434 A1* | 10/2012 | Woodard | ............... | G08G 1/144 |
| | | | | 701/423 |
| 2015/0161890 A1* | 6/2015 | Huntzicker | ............ | G08G 1/144 |
| | | | | 340/932.2 |

* cited by examiner

METHOD OF DETECTING AND PROVIDING PARKING SPACE INFORMATION AND/OR ROAD OBSTACLE INFORMATION TO VEHICLES

The present techniques relate to a method for detecting and providing parking space information and/or road obstacle information to vehicles. More particularly, the techniques relate to using vehicle sensors to detect parking spaces and/or road obstacles, and providing the detected parking space and/or road obstacle information to other vehicles.

BACKGROUND

Road user are often frustrated by the need to drive for considerable periods of time in order to locate a parking space. In addition, the additional time spent by drivers searching for parking spaces increases congestion on roads and increases pollution.

BRIEF SUMMARY

According to a first technique, there is provided a machine implemented method of identifying parking spaces for vehicles, said method comprising: detecting a space and a space location, said space being detected by at least one sensor provided at a sensing vehicle and said space location being detected by a location processor provided at said sensing vehicle; transferring said detected space location to a processing module remote from said vehicle; obtaining road data for said space location; determining whether said road data indicates parking restrictions which prevent parking at said detected space location; when it is determined that said road data indicates parking restrictions which prevent parking at said space location, determining that said detected space is not a parking space; and when it is determined that said road data indicates parking restrictions which do not prevent parking at said space location, determining that said detected space is a parking space, said determinations being performed by a processor provided at said remote processing module.

According to a second technique, there is provided a machine implemented method of identifying road obstacles, said method comprising: detecting a road obstacle and a road obstacle location, said road obstacle being detected by at least one sensor provided in a sensing vehicle and said road obstacle location being detected by a location processor provided at said sensing vehicle; transferring data regarding said detected road obstacle and said road obstacle location to a processing module remote from said sensing vehicle; receiving at said remote processing module a road obstacle request together with a location request from a requesting vehicle; determining whether one or more of said detected road obstacles are within a predetermined distance of said location request; and when one or more of said detected road obstacles are within a predetermined distance of said location request, transferring said one or more detected road obstacle locations to said requesting vehicle, said determinations being performed by a processor provided at said remote processing module.

According to a third technique, there is provided a system for identifying parking spaces for vehicles, said system comprising: a plurality of sensing vehicles, each said sensing vehicle provided with at least one vehicle sensor, said at least one vehicle sensor configured to detect a space and a space location; a remote processing module configured to receive said detected space and said space location from said plurality of sensing vehicles, and to obtain road data for said space location; and a plurality of requesting vehicles configured to transfer a parking space request together with a location request to said processing module, and to receive one or more of said detected parking space locations from said processing module when one or more of said detected parking space locations are within a predetermined distance of said location request.

According to a fourth technique, there is provided a computer program product comprising computer code for performing the methods described above.

BRIEF DESCRIPTION OF THE DRAWINGS

Embodiments will now be described with reference to the accompanying figures of which.

DETAILED DESCRIPTION

Vehicles which are provided with at least one sensor and a location system, such as a Global Positioning System (GPS) detect parking spaces and/or road obstacles when driving along a road. The detected parking space and/or road obstacle data is transferred to a remote processing module. The processing module may then provide the detected parking space and/or road obstacle data to a requesting vehicle, which is located in the vicinity of the detected parking space and/or road obstacle. In addition, the at least one sensor may detect road data, such as data regarding parking restrictions at the location of the detected parking space. The detected road data may be used to determine whether the detected parking space is available to the requesting vehicle. Furthermore, parking permit data may be used to determine whether the detected parking space is available to the requesting vehicle.

Current systems that provide parking space information to users are situated in parking garages. For example, a sensor is provided at each space in the parking garage, to detect whether the space is in use, and this information is displayed at the entrance to the parking garage, indicating how many spaces are available. Although effective, such a system can only be used in relation to fixed parking garages and require high set up costs since each space requires its own sensors. Such a system could not be deployed to open areas, such as public roads, because there is no "entrance" to the road where parking information could be displayed and the cost of installing sensors along roads becomes prohibitive.

Figure 1:
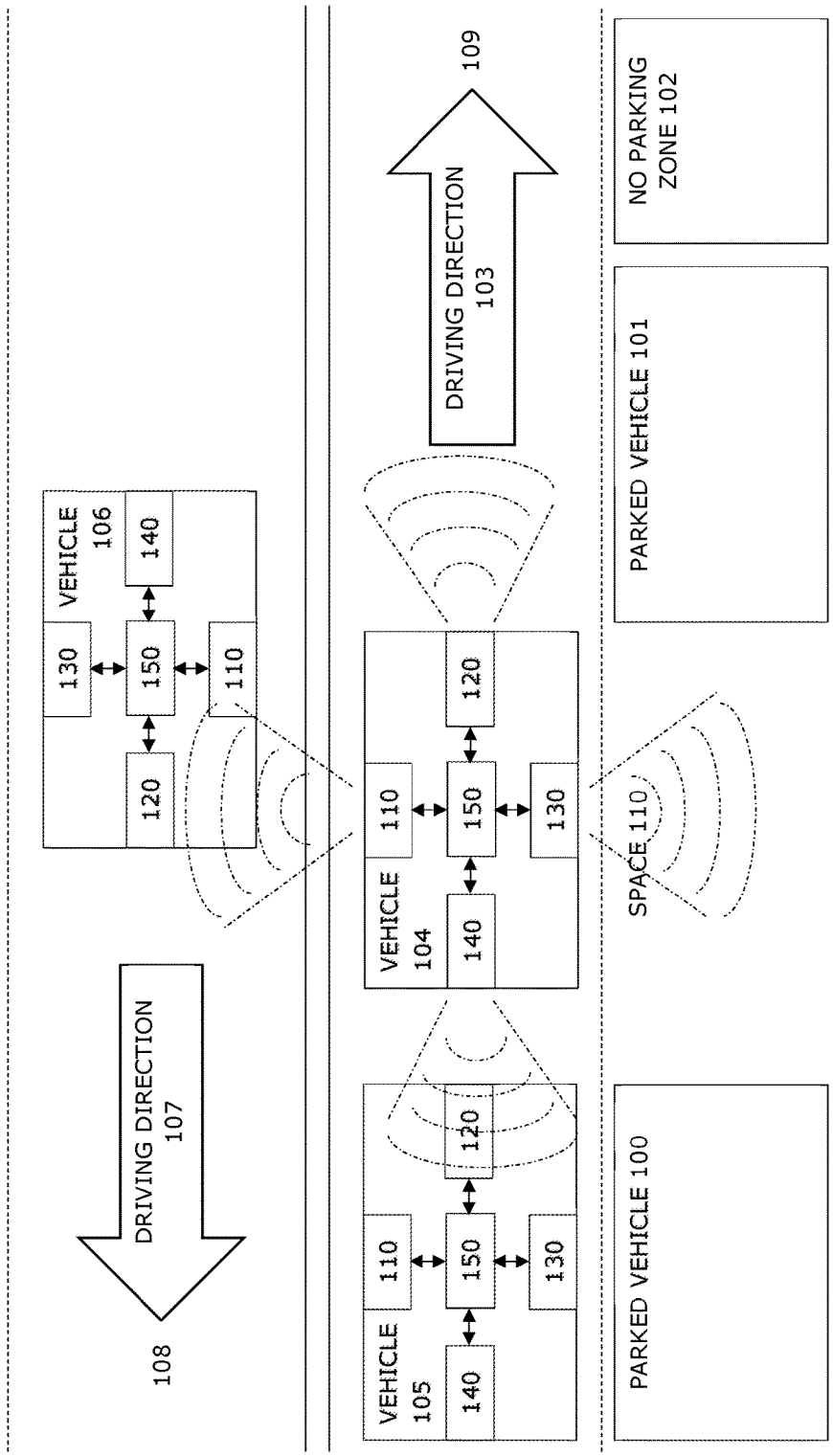
FIG. 1 illustrates schematically a system for locating parking spaces.

FIG. 1 illustrates schematically a system for locating parking spaces. FIG. 1 illustrates a road having two lanes 108, 109 of traffic. The traffic in lane 108 is traveling in direction 107, and the traffic in lane 109 is traveling in direction 103. Lane 109 also has parking spaces along one side. As illustrated in FIG. 1, vehicles 100 and 101 are parked along the side of lane 109, and there is a no parking zone 102 provided along the side of lane 109.

A sensing vehicle 104 is equipped with at least one sensor. FIG. 1 illustrates a sensing vehicle 104 equipped with a plurality of sensors, for example, front sensor 120, side sensors 110 and 130 and rear sensor 140. The front sensor 120 may comprise more than one sensor, the side sensor 1120 may comprise more than one sensor, the side sensor 130 may comprise more than one sensor, and/or the rear sensor 140 may comprise more than one sensor.

Although sensing vehicle 104 is illustrated as having front, side and rear sensors, a sensing vehicle may have any combination of sensors, for example, a sensing vehicle may only have a front sensor 120, or a sensing vehicle may only have a front sensor 120 and a side sensor 110, etc.

The sensors may be any type of known sensors, such as cameras, video cameras, infrared sensors, sonar sensors, lasers, etc. and each sensing vehicle may have any number and any combination of sensors as required.

According to one embodiment, the front sensor has a broad angle to enable it to detect parked cars.

The sensing vehicle 104 also comprises a processing module 150, which collects the data from the sensors. The sensors detect what is happening in the area surrounding the vehicle, in real time, and streams the detected data to the processing module 150.

As illustrated in FIG. 1, the sensing vehicle 104 drives along lane 109 of the road in direction 103. The sensor(s) of sensing vehicle 104 detect that there is a space 110 between the parked vehicle 100 and the parked vehicle 101 and transfers the detected space data to the processing module 150. The user/driver of the sensing vehicle 104 is not required to interact with the system for locating parking spaces. The sensors automatically detect a space and transfer the detected data to the processing module, so that the user/driver can concentrate on driving the vehicle. The user/driver of the sensing vehicle 104 may not be aware that a space has been detected. If a user/driver were required to input information whenever a space was detected, then the system could become very dangerous since the user/driver would not be concentrating on driving the vehicle.

In addition, in contrast to the parking garages system described above, the sensing vehicle 104 is provided with the sensor, rather than the space, consequently spaces can be detected in a large area, not limited to the area of a parking garage.

Figure 2:
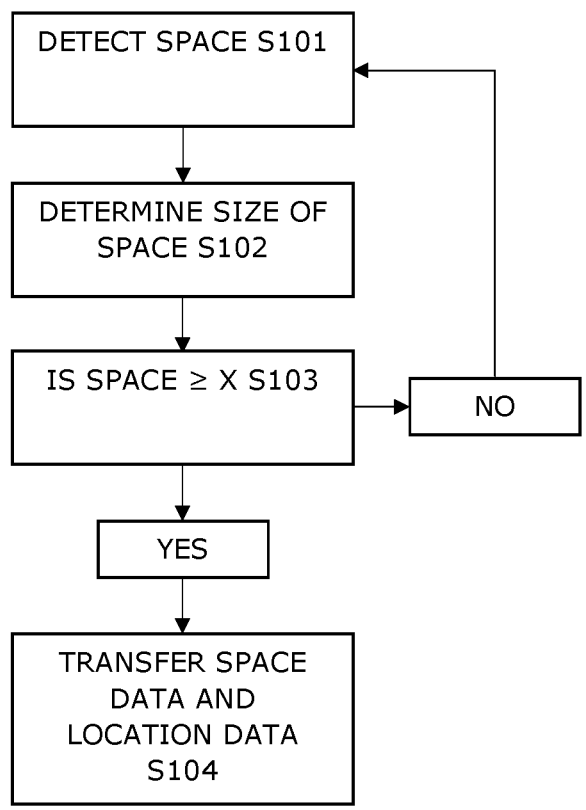
FIG. 2 illustrates a process flow diagram of a method for detecting parking spaces.

FIG. 2 illustrates a process flow diagram of a method for detecting parking spaces. As illustrated in FIG. 2, a space is detected at step S101. According to one embodiment, the sensor(s) of sensing vehicle 104 detect that there is a space 110 between the parked vehicle 100 and parked vehicle 101. At step S102 the size of the detected space is determined. For example, the processing module 150 determines the size of the space by determining the distance between the detected parked cars 100, 101. At step S103 it is determined whether the size of the detected space is greater than or equal to a predetermined minimum space size X. For example, the processing module 150 determines whether the distance between the parked cars 100, 101 is greater than the predetermined minimum space size X. When it is determined that the size of the detected space is less than the predetermined minimum space size X, then the process returns to step S101. When the size of the detected space is less than the predetermined minimum space size X, then it is determined that the detected space is not suitable as a parking space. When it is determined that the size of the detected space is greater than or equal to the predetermined minimum space size X, then the process moves onto step S104. When the size of the detected space is greater than or equal to the predetermined minimum space size X, then it is determined that the detected space may be suitable as a parking space. At step 104, for each detected space which is determined to be suitable as a parking space, space data, location data and, if available, image data are transferred from the processing module 150 to a remote processing module for example a service provider such as a cloud service.

According to this embodiment, the processing module 150 determines whether a detected space is suitable as a parking space. Consequently, the transfer of unnecessary data from the sensing vehicle to the service provider is minimised, since the processing module 150 does not transfer data regarding spaces which are not suitable as parking spaces.

The data detected by the sensors provided in the sensing vehicle 104 can be used to accurately determine the size of the detected space and then determine whether the space may be suitable as a parking space. Consequently, an accurate determination of parking spaces can be achieved when compared to asking humans to indicate parking spaces. For example, most humans are not able to accurately determine a distance between two objects, such as parked vehicles. In addition, humans are more likely to inaccurately determine that a space is suitable/not suitable as a parking space when compared to the parking space location system described herein.

The predetermined minimum space size X may be a predetermined distance X which defines a minimum distance required for a space to be considered suitable as a parking space. According to one embodiment, the distance X is predetermined by the service provider. The amount of space required to park a vehicle varies from vehicle to vehicle depending on the size of the vehicle. For example, a two seater Smart® car measures approximately 2.7 meters long and 1.5 meters wide, whereas a Mercedes-Benz® S-Class saloon car measures approximately 5.4 meters long and 1.9 meters wide, and a Ford® transit van measures approximately 4.0 meters long and 1.8 meters wide. Consequently, different vehicles require different sized parking spaces. However, some spaces will not be suitable as a parking space for any vehicles. For example, when the distance between the detected parked cars 100, 101, is only 1 meter, then the space between the detected parked cars 100, 101 may not be considered suitable as a parking space for any vehicles.

According to one embodiment, based on a two seater Smart® car measuring approximately 2.7 meters long, the minimum space size X is predetermined to be 3 meters. Referring to the process illustrated in FIG. 2, the sensor(s) of sensing vehicle 104 detect that there is a space 110 between the parked vehicle 100 and parked vehicle 101 at step 101. At step S102 it is determined that the size of the detected space is 1.9 meters. It is then determined, at step S103, that 1.9 meters is less than 3 meters (the predetermined minimum space size X in this example). As a result of the determination, the detected space is not considered suitable as a parking space. According to one embodiment, since a space of 1.9 meters is not considered suitable as a parking space, the processing module 150 does not transfer the space data to the service provider.

However, when it is determined that the size of the detected space is greater than or equal to 3 meters, for example, 3.3 meters, then the detected space is considered to be suitable as a parking space. The process of FIG. 2 then moves onto step S104 and the space data is transferred to the service provider.

According to one embodiment, the space data comprises the data detected by the sensor(s), identifying a space. The space data may comprise the size of the space. Location data comprising the location of the detected space is also transferred to the service provider with the space data. The location data may be any data that can be used to identify the location of the space. For example, the location of the space may be provided as the GPS location of the space. The location data may be transferred to the service provider together with the space data. The location data may include an identifier, which can be used to associate the location data with the space data.

Space image data, providing an image of the space may also be transferred to the service provider, if available, together with the space data. The space image data may be transferred to the service provider together with the space data. The space image data may include an identifier, which can be used to associate the image data with the space data. The type of space image data transferred will depend on the type of sensor(s) present in the sensing vehicle. For example, when one of the sensors provided in the sensing vehicle is a camera or video camera, then the image may be a photograph/still video image of the parking space, and/or when one of the sensor(s) provided in the vehicle is a sonar sensor, then the image may be a sonar image of the parking space.

The data transferred from the processing module 150 to the service provider is transferred anonymously to the service provider.

According to another embodiment, the processing module 150 provided at the sensing vehicle is not required to determine whether the detected space is of a size greater than the predetermined minimum space size X. According to this embodiment, the processing module determines the size of the space, for example the distance between the detected parked cars 100, 101, and then transfers the space data together with the determined size of the space, location data and, if available, image data to the service provider. The service provider then determines whether the space is of a size suitable as a parking space. The predetermined minimum space size X required for a parking space varies depending on the size of the vehicle which is looking for a space. According to this embodiment, the amount of computations that are performed by the processing module at the sensing vehicle is minimised. In addition, spaces are not being discounted as parking spaces by the processing module, which might be suitable as parking spaces for some vehicles.

According to another embodiment, the processing module 150 provided at the sensing vehicle is not required to determine the size of the detected space. According to this embodiment, the processing module 150 transfers the space data and the location data, indicating the location of the space to the service provider. The service provider then determines the size of the space and whether the space is of a size considered suitable as a parking space. According to this embodiment, the amount of computations that are performed by the processing module at the sensing vehicle is further minimised.

The vehicle sensors 110, 120, 130, 140 are not limited to detecting parked vehicles 100, 101, and may also detect other objects, such as skips etc. in order to detect a space 110.

The vehicle sensors 110, 120, 130, 140 may also be capable of detecting road data, which can be used to determine whether a detected space is suitable as a parking space. Examples of road data are:
signs indicating parking restrictions;
signs indicating required parking permits;
fire hydrants;
parking gates;
markings provided on the road and/or side walk;
the colour of markings provided on the road and/or side walk;
pedestrian crossings marked on the road;
distance of a detected space from road junctions, and applying a predetermined distance before and after the junctions as a "no-parking" zone.

The above list of road data is not exhaustive and other road data which is relevant to the determination of parking restriction may also be detected by the sensors.

The detected road data may be transferred from the processing module to the service provider. The road data may be transferred from the processing module together with location data indicating the location of the detected road data. The road data may also be transferred from the processing module together with road image data of the detected road data if available. The road data may include an identifier, which can be used to associate the road data with the location of the road data and/or the road image data.

The type of road image data transferred will depend on the type of sensor(s) present in the sensing vehicle. For example, when one of the sensors provided in the sensing vehicle is a camera or video camera, then the road image may be a photograph/still video image of the road data (such as a sign or an image of a road marking etc.).

The road data transferred from the processing module 150 to the service provider is transferred anonymously to the service provider.

According to one embodiment, the service provider uses recognition software to determine parking restrictions from the detected road data. For example, word recognition software may be used to decipher ("read") road images, such as signs indicating parking restrictions and/or required parking permits. The service provider may also use recognition software to determine parking restrictions indicated by the road data, such as the type of road markings and/or the colour of the road markings. Examples, of different types of markings provided on the road and/or side walk include box junctions, give way, bus stops, bus lanes, single lines, double lines, hazards, keep clear, stop, arrows, chevrons etc. The recognition software is capable of deciphering the type of marking and/or the colour of the marking detected by the sensors. Road markings vary from country to country and may have different meanings in different countries. For example, in the UK, double yellow lines provided along the left of the road, indicates that a vehicle is prohibited from stopping (or parking) on the double yellow lines 24 hours per day, 7 days per week. However, in the USA, double yellow lines provided between the two directions of traffic flow on a road, indicates a no-passing restriction or no passing zone. Therefore, the service provider may use a database detailing the different implications of each different road marking and/or colour of road marking, which is location specific, to determine the significance of the detected road data to the detected space, if at all.

According to another embodiment, the processing module uses recognition software to determine the parking restrictions from the road data, and transfers the determined parking restrictions to the service provider.

Alternatively, or in addition to the road data detected by the sensing vehicle, the service provider may obtain road data from third parties. For example, parking restriction data and parking permit data may be obtained from one or more parking databases held by municipal or national authorities. The service provider may synchronise with the parking database(s) periodically in order to maintain an up-to-date database of parking restrictions/permits.

In addition, road data such as the markings provided on the road and/or side walk, pedestrian crossings data, distance to road junction data etc. may also be obtained, by the service provider, from one or more road databases. When the service provider receives an indication of a space being detected at a location, the service provider may retrieve the road data associated with that location from a road database and apply it to the location to determine whether the space is a suitable parking space. For example, when the road data indicates that the detected space is too close to a road junction, then the space is not considered to be a suitable parking space.

Road data obtained from the sensing vehicles and/or databases may be considered more accurate than road data provided by humans since most road users tend not to be able to remember the significant of each road marking, or may remember incorrectly the significance of each road marking.

There may be a plurality of sensing vehicles dispersed across a network, detecting a plurality of available parking spaces. The plurality of sensing vehicles may detect the same or different available parking spaces depending in the location of the sensing vehicle and the time period during which the sensing vehicles are at a location.

Figure 3:
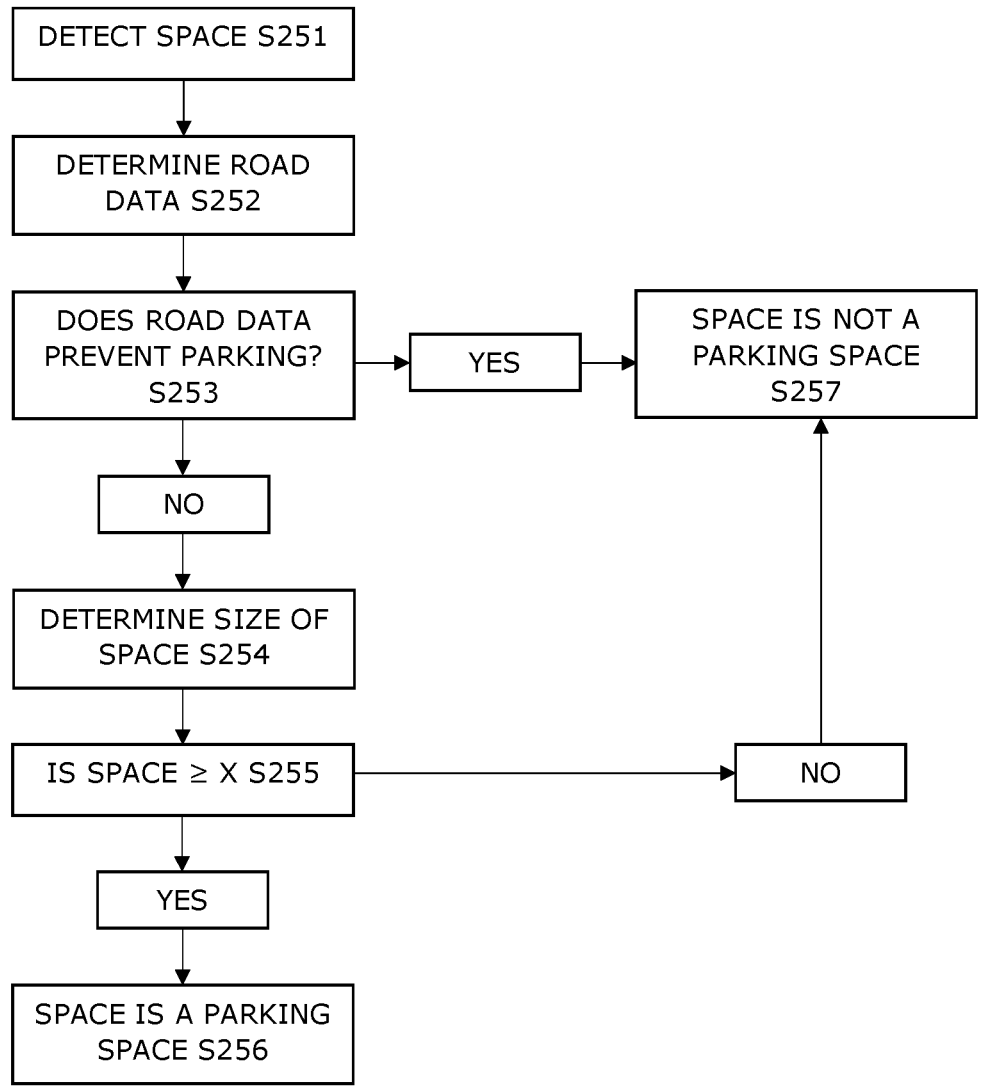
FIG. 3 illustrates a process flow diagram of a method for detecting parking spaces.

FIG. 3 illustrates a process flow diagram of another method for detecting parking spaces. As illustrated in FIG. 3, a space is detected at step S251. According to one embodiment, the sensor(s) of sensing vehicle 104 detect that there is a space 110 between the parked vehicle 100 and parked vehicle 101. At step S252 road data is determined. According to one embodiment, the sensor(s) of sensing vehicle 104 detect the road data at the location of the detected space, and/or in the vicinity of the detected space. According to another embodiment, the road data is determined from a road database.

At step S253 it is determined whether the road data prevents parking at the detected space. For example, as described above, when the road data indicates that the detected space is too close to a road junction, then the space is not considered to be a suitable parking space. When it is determined that the road data indicates parking restrictions which prevent parking at the detected space, then the process moves to step S257, and it is determined that the space is not suitable as a parking space.

When it is determined that the road data indicates parking restrictions which do not prevent parking at the detected space, then it is determined that the space is suitable as a parking space.

The process may then move onto step S254. At step S254, the size of the detected space is determined. At step S255 it is determined whether the size of the detected space is greater than or equal to a predetermined minimum space size X. When it is determined that the detected space is greater than or equal to the predetermined minimum space size X, then the process moves onto step S256 and it is determined that the space is suitable as a parking space.

According to another embodiment, the steps of S254 and S255 of determining whether the space is greater than a predetermined minimum size may be performed before the determination of the road data.

Figure 4:
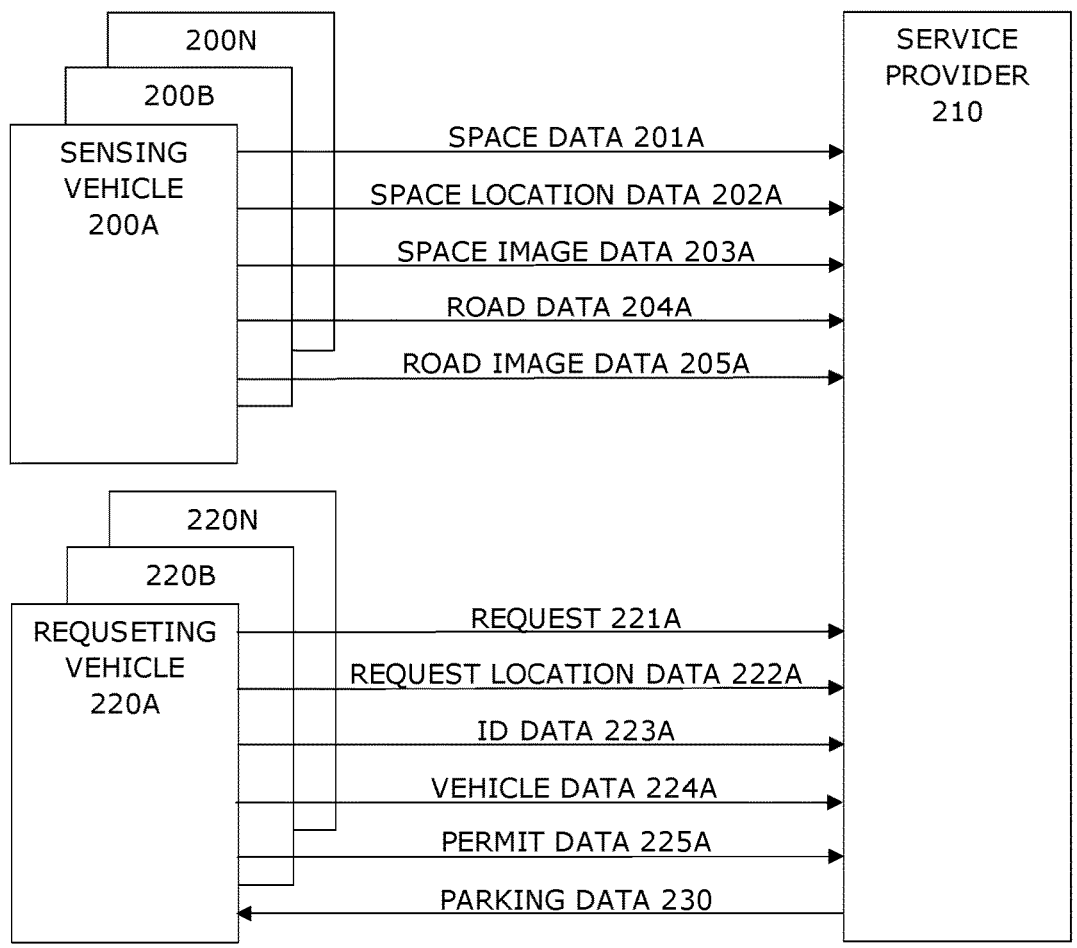
FIG. 4 illustrates schematically a system for detecting and providing parking space information.

FIG. 4 illustrates schematically a system for detecting and providing parking space information comprising a plurality of sensing vehicles, a service provider and a plurality of requesting vehicles.

The plurality of sensing vehicles 200A, 200B, . . . , 200N are provided in a network. The plurality of sensing vehicles 200A, 200B, . . . , 200N transfer space data 201, space location data 202, space image data 203, road data 204 and road image data 205 to a service provider 210. Although FIG. 4 illustrates the sensing vehicles transferring space data 201, space location data 202, space image data 203, road data 204 and road image data 205, each sensing vehicle may transfer any combination of data to the service provider 210. According to one embodiment, a sensing vehicle may transfer space data 201 and space location data 202 to the service provider 210. According to another embodiment, a sensing vehicle may transfer space data 201, space location data 202 and space image data 201 to the service provider 210. According to another embodiment, a sensing vehicle may transfer space data 201, space location data 202 and road data 204 to the service provider 210. According to another embodiment, a sensing vehicle may transfer space data 201, space location data 202 and road image data 205 to the service provider 210. According to another embodiment, a sensing vehicle may transfer space data 201, space location data 202, space image data 203 and road data 204 to the service provider 210. According to another embodiment, a sensing vehicle may transfer space data 201, space location data 202, space image data 203 and road image data 205 to the service provider 210.

Each sensing vehicle may have a different number of sensors and/or different types of sensors from the other sensing vehicles in the network. Therefore, each sensing vehicle transfers to the service provider the data 201, 202, 203, 204, 205 which it has received from its sensor, which may result in a plurality of different sensing vehicles transferring a plurality of different combinations of data 201, 202, 203, 204, 205 to the service provider 210. According to one embodiment, the service provider 210 may request the types of data it receives. For example, a service provider 210 which has access to a third parties' database of road data, may not require road data to be transferred from the sensing vehicles.

Returning to FIG. 4, a requesting vehicle 220A, also provided in the network, requires a parking space. The requesting vehicle transfers a request for parking space data 221A to the service provider 210. The request 221A may be transferred together with request location data 222A. According to one embodiment the request location data is the current location of the requesting vehicle 220A.

A requesting vehicle is equipped with a parking finder system, and submits the request for parking space data via the parking finder system. The parking finder system may be built into the requesting vehicles existing navigation system, such as Waze, may be an independent module from the requesting vehicles navigation system, or may be provided in a mobile device, such as a user's mobile phone, which in use is placed in the requesting vehicle. According to one embodiment, the parking finder system maybe an application.

ID data 223A may also be transferred to the service provider 210. The ID data 223A may identify the user of the parking space location system and/or the requesting vehicle. Accordingly, the ID data 223A may comprise vehicle ID data and/or user ID data. The ID data 223A may be used by the service provider 210 to determine whether the user and/or requesting vehicle is entitled to receive parking space data from the service provider 210.

According to one embodiment, the requesting vehicle 220A transfers vehicle data 224A, such as the make and model of the requesting vehicle when the requesting vehicle connects to the service provider 210 for the first time. Alternatively, the service provider 210 may request the vehicle data 224A from the requesting vehicle 220A when the requesting vehicle 220A connects to the service provider 210 for the first time. According to another embodiment, the requesting vehicle 220A transfers vehicle data 224A, such as the make and model of the requesting vehicle to the service provider 210 whenever the requesting vehicle submits a request for parking space data. For example, a user of the parking space location system may have access to different vehicles, each vehicle having different dimensions. According to another embodiment, the requesting vehicle 220A transfers vehicle data 224A, such as the make and model of the requesting vehicle to the service provider 210 periodically, for example, the service provider 210 may periodically request the vehicle data 224A to check that the user is still using the same requesting vehicle.

The service provider 210 uses the vehicle data 224A to determine the size (length and/or width and/or height) of the requesting vehicle. For example, the service provider 210 may have access to a vehicle database, such that the service provider 210 can determine the size of the requesting vehicle 220A based on the make and model of the requesting vehicle. According to one embodiment, the size of the requesting vehicle may be associated with the requesting vehicle ID 223A and stored at the service provider 210. According to this embodiment, the requesting vehicle is only required to transfer vehicle data 224A when the requesting vehicle 220A connects to the service provider 210 for the first time, or periodically. According to another embodiment, the service provider 210 may require the requesting vehicle 220A to transfer vehicle data 224A, every time the requesting vehicle 220A requests parking space data. According to another embodiment, vehicle data regarding more than one vehicle may be associated with the user ID 223A and stored at the service provider 210, such that the user of the parking space location system selects which vehicle is the requesting vehicle when using the system.

The requesting vehicle 220A may also transfer permit data 225A to the service provider 210, either together with the request 221A, when first using the system, or periodically. Examples of permit data 225A comprise any permits which the user of the system and/or the requesting vehicle of the system has, such as a residence parking permit, an employee parking permit, a disabled parking permit etc.

The parking finder system provided at the requesting vehicle 220A comprises a processing module 150, and the request is transferred from the processing module 150 to the service provider 210.

The service provider 210 comprises information regarding a plurality of spaces received from the plurality of sensing vehicles. However, not all of the spaces may be appropriate for the requesting vehicle. For example, the size of the requesting vehicle may be used to determine which parking spaces are suitable for the requesting vehicle. As discussed above, a two seater Smart® car measures approximately 2.7 meters long and 1.5 meters wide, a Mercedes-Benz® S-Class saloon car measures approximately 5.4 meters long and 1.9 meters wide, and a Ford® transit van measures approximately 4.0 meters long and 1.8 meters wide.

The service provider uses the vehicle data 224A to determine the size (length and/or width and/or height) of the requesting vehicle. The service provider may then use algorithms to determine whether a detected space is suitable as a parking space for the requesting vehicle. For example, a parallel parking space is generally required to be at least 1.25 meters longer than the length of the requesting vehicle in order to be considered as a parking space for the requesting vehicle. Equation 1 may be applied by the service provider to determine when a parallel parking space is suitable as a parking space for the requesting vehicle.

$$\text{Parallel parking space} \geq \text{Length of vehicle} + 1.25 \text{ meters} \quad \text{Equation 1.}$$

The service provider may determine that a space, which measures 4.5 meters long is an appropriate parking space when the requesting vehicle is a Smart® car, but that the space is not an appropriate parking space when the requesting vehicle is a Mercedes-Benz® S-Class car.

According to another example, a perpendicular parking space is required to be at least 0.4 meters wider than the width of the requesting vehicle in order to be considered as a parking space of the vehicle. Equation 2 may be applied by the service provider to determine when a perpendicular parking space is suitable as a parking space for the requesting vehicle.

$$\text{Parallel parking space} \geq \text{Width of vehicle} + 0.4 \text{ meters} \quad \text{Equation 2.}$$

Figure 5:
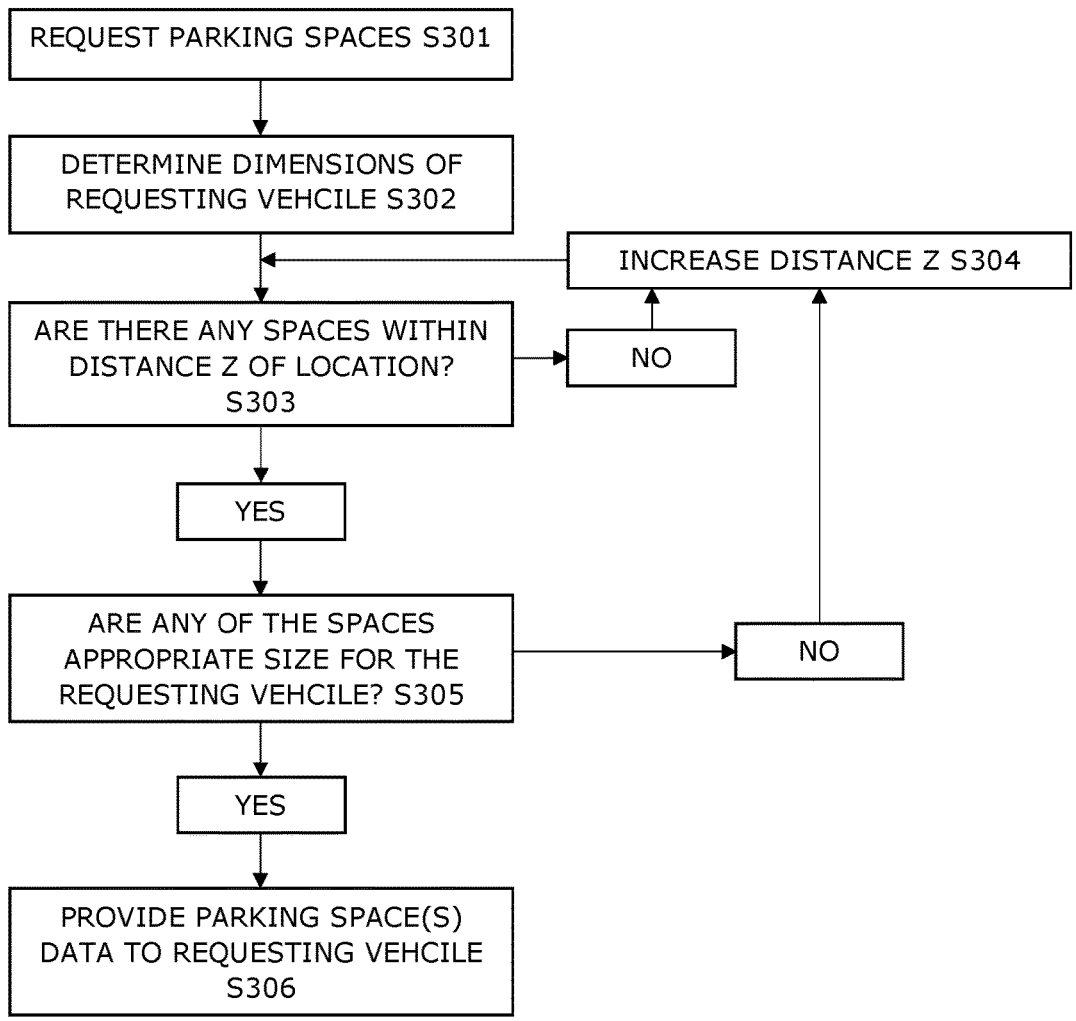
FIG. 5 illustrates a process flow diagram of a method for identifying parking spaces for a requesting vehicle.

FIG. 5 is a process flow diagram illustrating a method of identifying parking spaces for a requesting vehicle. At step S301, a requesting vehicle requests parking space information. According to one embodiment, the request comprises an ID (the requesting vehicles ID and/or the users ID) and the requesting vehicles location data. At step S302, the service provider determines the dimensions of the requesting vehicle. According to one embodiment, the service provider may have determined the dimensions of the requesting vehicle when the requesting vehicle connected to the service provider for the first time, and the service provider associated the dimensions of the requesting vehicle with the requesting vehicles ID and/or the users ID. According to another embodiment, the service provider may have access to a vehicle database, such that the service provider may determine the size of the requesting vehicle, whenever a request is received.

The service provider uses the data provided by the plurality of sensing vehicles, at step S303, to determine whether there are any spaces within a predetermined distance Z of the requesting vehicles location. According to one embodiment, the distance Z may be 0.5 kilometers. When there are no spaces within the predetermined distance Z of the requesting vehicles location, then the distance Z is increased as step S304. For example, the distance Z may be increased by 0.2 kilometer increments, from 0.5 kilometers to 0.7 kilometers. The process then returns to step S303, and it is determined whether there are any spaces within the (increased) predetermined distance Z of the requesting vehicles location.

When there are one or more spaces within the predetermined distance Z of the requesting vehicles location, the process moves onto step S305. At step S305 it is determined whether any of the spaces, which are within the predetermined distance Z of the requesting vehicles location, are of a size which is appropriate for the requesting vehicle. The service provider uses the requesting vehicles dimensions and algorithms, such as those described above, to determine whether any of the one or more spaces are big enough for the requesting vehicle. When none of the spaces are big enough for the requesting vehicle, then the process returns to step S304 and the distance Z is increased.

However, when one or more of the spaces are big enough for the requesting vehicle, then the process moves to step S306 and the service provider provides details of the appropriate spaces to the requesting vehicle. The details of the spaces which are provided to the requesting vehicle may include the location of the space, as well as the size of the space, and if available, image(s) of the parking spaces.

According to one embodiment, when there is more than one space which is considered appropriate for the requesting vehicle, the service provider provides a list of available parking spaces to the requesting vehicle. The list of spaces may be prioritised such that the parking space nearest to the requesting vehicles location is provided at the top of the list.

When a list of appropriate parking spaces is provided to the requesting vehicle the user of the requesting vehicle may be required to select a parking space from the list. The requesting vehicle can then navigate to the location of the parking space. According to one embodiment, the processing module of the parking finder system is linked to a navigational system (not illustrated), such as the requesting vehicles navigational system, and the location of the parking space is sent to the navigation system.

According to another embodiment, not illustrated, the size of the requesting vehicle is not required. According to this embodiment, the predetermined minimum space size X which is used to determine whether a space detected by a sensing vehicle is suitable as a parking space, is set to size which is appropriate for most vehicles. According to this embodiment, a requesting vehicle requests parking space information, the request comprising an ID (the requesting vehicles ID and/or the users ID) and the requesting vehicles location data. The service provider then uses the data provided by the plurality of sensing vehicles to determine whether there are any spaces within a predetermined distance Z of the requesting vehicles location. When there are no spaces within the predetermined distance Z of the requesting vehicles location, then the distance Z is increased and it is determined whether there are any spaces within the (increased) predetermined distance Z of the requesting vehicles location.

When there are one or more spaces within the predetermined distance Z of the requesting vehicles location, the service provider provides details of the spaces to the requesting vehicle. The details of the spaces which are provided to the requesting vehicle may include the location of the space and if available, image(s) of the parking spaces.

According to one embodiment, when there is more than one space which is considered appropriate for the requesting vehicle, the service provider provides a list of available parking spaces to the requesting vehicle. The list of spaces may be prioritised such that the parking space nearest to the requesting vehicles location is provided at the top of the list.

When a list of appropriate parking spaces is provided to the requesting vehicle the user of the requesting vehicle may be required to select a parking space from the list. The requesting vehicle can then navigate to the location of the parking space. According to one embodiment, the processing module of the parking finder system is linked to a navigational system (not illustrated), such as the requesting vehicles navigational system, and the location of the parking space is sent to the navigation system.

The service provider may also comprise information regarding parking restrictions received from the plurality of sensing vehicles, as road data. As a result of the parking restrictions, some (none or all) of the spaces may not be appropriate for the requesting vehicle. For example, road data may indicate that parking is restricted within the times of 8 am and 5 pm at a specific location, and consequently a request for parking space data received between the times of 8 am and 5 pm, at that location, would not identify an available space within that parking restriction to be appropriate. Whereas, a request for parking space data received outside the times of 8 am and 5 pm at the specific location would identify an available space within that parking restriction to be appropriate. A time buffer may be applied to parking restrictions by the service provider, if required. For example, if a request for parking space data was received at 7:55 am then an available space within the above mentioned parking restriction would not be identified as appropriate.

Furthermore, when the requesting vehicle has provided permit data to the service provider, then the permit data, which indicates parking permissions applicable to the user and/or requesting vehicle may be applied by the service provider when determining whether an available space is appropriate for the requesting vehicle. For example, the requesting vehicle may have a parking permit permitting parking, which is restricted for other requesting vehicles. The service provider applies the parking permit data when determining whether an available space is an appropriate space for the requesting vehicle. An example of a parking permit may be a residence parking permit, which allows residence, with the required permit to park in space, which are not available for non-residence. Consequently, when a requesting vehicle has the required parking permit, then an available space would be considered an appropriate space for the requesting vehicle, whereas an available space would not be considered an appropriate space when the requesting vehicle does not have the required permit.

According to one embodiment, the permit data may be associated with the requesting vehicle ID 223A and/or a user ID stored at the service provider 210. According to this embodiment, the requesting vehicle is only required to transfer permit data 225A when the requesting vehicle 220A connects to the service provider 210 for the first time, and the permit data is associated with the requesting vehicle ID 223A and stored at the service provider. According to another embodiment, the requesting vehicle may be required to transfer permit data 225A periodically to the service provider 210, such that the service provider can verify that the requesting vehicle still has valid parking permits. According to another embodiment, the service provider may require the requesting vehicle 220A to transfer permit data 225A every time the requesting vehicle 220A requests parking space data. According to another embodiment, a user of system may have permit data 225A associated with them, not the specific vehicle they are travelling in, such as a disabled user. According to this embodiment, the permit data may be associated with the user ID and/or the requesting vehicle ID. According to a further embodiment, a user of the system who has access to several different vehicles may be required to indicate which vehicle is the requesting vehicle and which parking permits (if any) apply to that vehicle.

Figure 6:
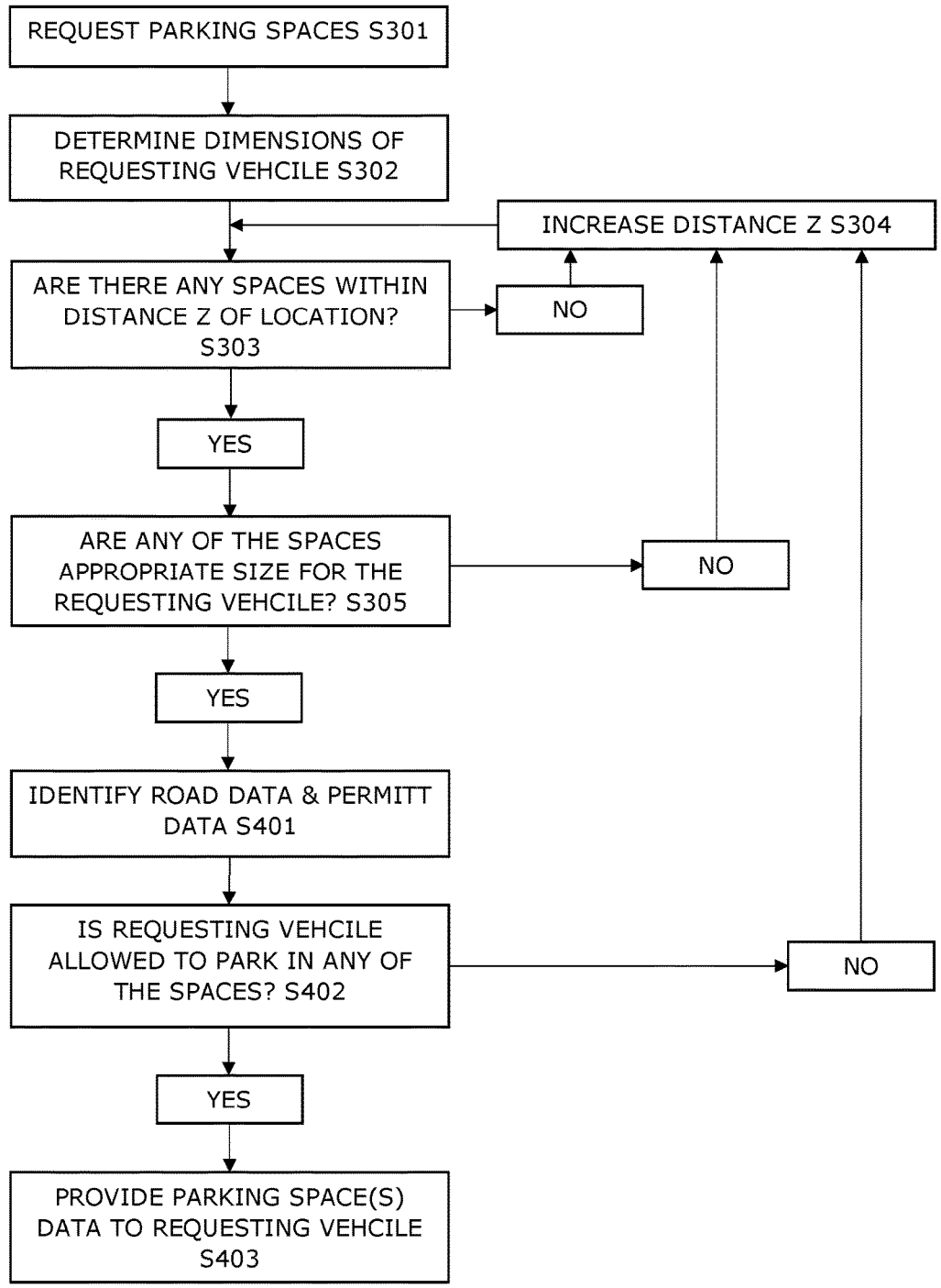
FIG. 6 illustrates another process flow diagram of a method for identifying parking spaces for a requesting vehicle.

FIG. 6 is another process flow diagram illustrating a method of identifying parking spaces for a requesting vehicle. In FIG. 6, steps S301 to S305, are the same as those described above with reference to FIG. 5. However, according to the method of FIG. 6, following a determination that one or more of the spaces are of a size appropriate for the requesting vehicle, the process moves to step S401. At step S401, the road data, such as parking restrictions, which apply to the parking spaces are identified. In addition, the service provider may identify any parking permits associated with the requesting vehicle/user are identified at step S401. The road data may be restricted parking zones identified by the sensing vehicles, which apply to each available space. At step S402 it is determined whether the road data applies to the available space(s) and whether the requestor (vehicle and/or user) have a permit which applies to the available space(s). For example, a sensing vehicle may have detected that a space is available, but the road data indicates that only residence with the appropriate permit are allowed to park in the space. When the requesting vehicle has the required permit, then the service provider determines at step S402 that the requesting vehicle is allowed to park in the available space, and therefore provides data regarding the space to the requesting vehicle. However, when the requesting vehicle does not have the required permit then the service provider determines at step S402 that the requesting vehicle is not allowed to park in the available space and consequently does not provides data regarding the space to the requesting vehicle.

When there are no spaces within the distance Z of the requesting vehicle, that have a size appropriate for the requesting vehicle, or which have parking restrictions that prevent the requesting vehicle from parking in the space and the requesting vehicle/user do not have any parking permits that enable the requesting vehicle to park in the space, then the process returns to step S304 and the distance Z is increased.

However, when there are one or more spaces within the distance Z of the requesting vehicle, that have a size appropriate for the requesting vehicle, and which have no parking restrictions that prevent the requesting vehicle from parking in the space and/or the requesting vehicle/user have parking permit(s) that enable the requesting vehicle to park in the space, then the process moves to step S403 and the service provider provides details of the appropriate spaces to the requesting vehicle. The details of the spaces which are provided to the requesting vehicle may include the location of the space, the size of the space, the parking restrictions which apply to the space and if available, image(s) of the parking spaces and image(s) of the road data (such as parking restrictions).

According to another embodiment, not illustrated, the size of the requesting vehicle is not required. According to this embodiment, the predetermined minimum space size X which is used to determine whether a space detected by a sensing vehicle is suitable as a parking space, is set to size which is appropriate for most vehicles. According to this embodiment, a requesting vehicle requests parking space information, the request comprising an ID (the requesting vehicles ID and/or the users ID) and the requesting vehicles location data. The service provider then uses the data provided by the plurality of sensing vehicles to determine whether there are any spaces within a predetermined distance Z of the requesting vehicles location. When there are no spaces within the predetermined distance Z of the requesting vehicles location, then the distance Z is increased and it is determined whether there are any spaces within the (increased) predetermined distance Z of the requesting vehicles location.

When there are one or more spaces within the predetermined distance Z of the requesting vehicles location, the road data, such as parking restrictions, which apply to the parking spaces are identified. In addition, the service provider may identify any parking permits associated with the requesting vehicle/user. It is the determined whether the road data applies to the available space(s) and whether the requestor (vehicle and/or user) have a permit which applies to the available space(s).

When there are no spaces within the distance Z of the requesting vehicle, which according to the road data and/or permit data the requesting vehicle is allowed to park in, then the distance Z is increased.

However, when there is one or more spaces within the distance Z of the requesting vehicle, which according to the road data and/or permit data the requesting vehicle is allowed to park in, then the service provider provides details of the spaces to the requesting vehicle. The details of the spaces which are provided to the requesting vehicle may include the location of the space, the size of the space, the parking restrictions which apply to the space and if available, image(s) of the parking spaces and image(s) of the road data (such as parking restrictions).

According to one embodiment, when more than one space is identified which is considered appropriate for the requesting vehicle, then the service provider may provide a list of available parking spaces to the requesting vehicle. The list of spaces may be prioritised based on distance from the requesting vehicles current location, such that the parking space nearest to the requesting vehicles location is provided at the top of the list, followed by the second nearest etc.

According to another embodiment, when more than one space is identified which is considered appropriate for the requesting vehicle, then the service provider may provide a list of available parking spaces to the requesting vehicle. The list of spaces may be prioritised based on driving time from the requesting vehicles current location to the space, such that the parking space with the shortest driving time to the requesting vehicles current location is provided at the top of the list, followed by the second shortest etc. The driving time from the requesting vehicles current location to the location of the space may be determined either by a navigation system provided at the service provider, or by a navigation system provided at the requesting vehicle.

According to one embodiment, when more than one space is identified which is considered appropriate for the requesting vehicle, then the service provider may provide a list of available parking spaces to the requesting vehicle. The list of spaces may be prioritised based on the time since parking space was detected, such that the parking space having the shortest time since it was detected is provided at the top of the list, followed by the second shortest etc.

According to another embodiment, when more than one space is identified which is considered appropriate for the requesting vehicle, then the service provider may provide a list of available parking spaces to the requesting vehicle. The list of spaces may be prioritised such that the parking space which have no parking restrictions are provided at the top of the list, followed by the space(s) which do have parking restrictions.

According to another embodiment, when more than one space is identified which is considered appropriate for the requesting vehicle, then the service provider may provide a list of available parking spaces to the requesting vehicle. The list of spaces may be prioritised according to parking restrictions, and matched against any parking permits of the requesting vehicle/user of the requesting vehicle.

The service provider may use recognition software to determine parking tariffs associated with available spaces from the detected road data. For example, word recognition software may be used to decipher ("read") road images, such as signs indicating parking tariffs. Alternatively, or in addition, parking tariffs may be provided by an external database to the service provider. When more than one space is identified which is considered appropriate for the requesting vehicle, then the service provider may provide a list of available parking spaces to the requesting vehicle. Each space on the list may indicate the associated parking tariffs, and the list of spaces may be ordered based on an estimated tariff for parking in the space. According to one embodiment, the cost estimation may be performed by matching known user/requesting vehicle parking permits, with detected parking tariffs, and calculating an estimated cost for the user. According to one embodiment, the list of spaces may be prioritised such that the parking space which have smallest associated parking tariff are provided at the top of the list.

Parking tariffs may also be calculated according to the detected parking restrictions, for example, free, x per hour, flat cost until certain hour, discount for local resident etc.

According to another embodiment, the list of spaces may be filtered according to a user requested criteria, such as time since the parking space was detected, the distance to parking space, the driving time to parking space, the parking restrictions which apply at the current day and time, the detected tariff of the parking space which apply at the current day and time, parking space available to a parking permit, such as residence permits, disabled parking permits etc.

According to another embodiment, the list of spaces may be filtered according to external factors. For example, when there is bad weather, such as rain or ice, or when the user has a pending appointment in their calendar, then the list of spaces may be filtered according to the distance to parking space. Such preference may be predefined by the user. According to this embodiment, the processing module of the parking finder system is linked to the users calendar and/or the vehicles processing module, when the vehicles processing module is capable of detecting bed weather.

When a list of appropriate parking spaces is provided to the requesting vehicle the user of the requesting vehicle may be required to select a parking space from the list. The requesting vehicle can then navigate to the location of the parking space. According to one embodiment, the processing module of the parking finder system is linked to a navigational system (not illustrated), such as the vehicle navigational system, so that the location of the parking space is sent to the vehicles navigation system.

Referring to FIG. 6, the step of determining whether a space is of an appropriate size for the requesting vehicle (step S305) and the step of determining whether the requesting vehicle is allowed to park in a space (step S402) may be performed the other way around. For example, following identification of one or more spaces at step S303, it is first determined whether the requesting vehicle is allowed to park in the space(s) (step S402), followed by determining whether a space(s) is an appropriate size for the requesting vehicle (step S305). In a further embodiment, steps S305 and S401 may be performed at the same time.

The list of parking space data applied to the requesting vehicle can be updated, periodically, such as once every minute, with up to data information supplied by the sensing vehicles. Thereby reducing the likelihood of the service provider providing data indicating that a parking space is available, which is no longer available.

According to another embodiment, a requesting vehicle may also request parking space data for a location that it is travelling too. According to this embodiment, the location data of the request 222A is the location within which the user of the system desires a parking space. For example, the user may desire parking space data for a location that the user will arrive at in 5 minutes. The service provider determines available parking space data using the same methods described above with reference to FIGS. 4 and 5 and transfers the requested parking space data to the requesting vehicle. However, the longer it takes the requesting vehicle to arrive at the location, then the less accurate the parking space data may become.

The service provider receives parking space data from a plurality of sensing vehicles, continuously, when available, over a network. The received parking space data is stored in a database at the service provider together with a time the data was received. According to one embodiment, the data is only kept for a predetermined period of time A, such as 15 minutes. After the time period A has elapsed, the data is no longer considered accurate and is removed from the database. According to one embodiment, when information is provided about a parking space which is already known, instead of storing the parking space data, the time the data was received is updated to the current time. The service provider may also apply a weighting factor to the parking data, such that parking data received recently, is considered to be more reliable, and given a higher weighting than parking data received near the end of the predetermined time period A.

Figure 7:
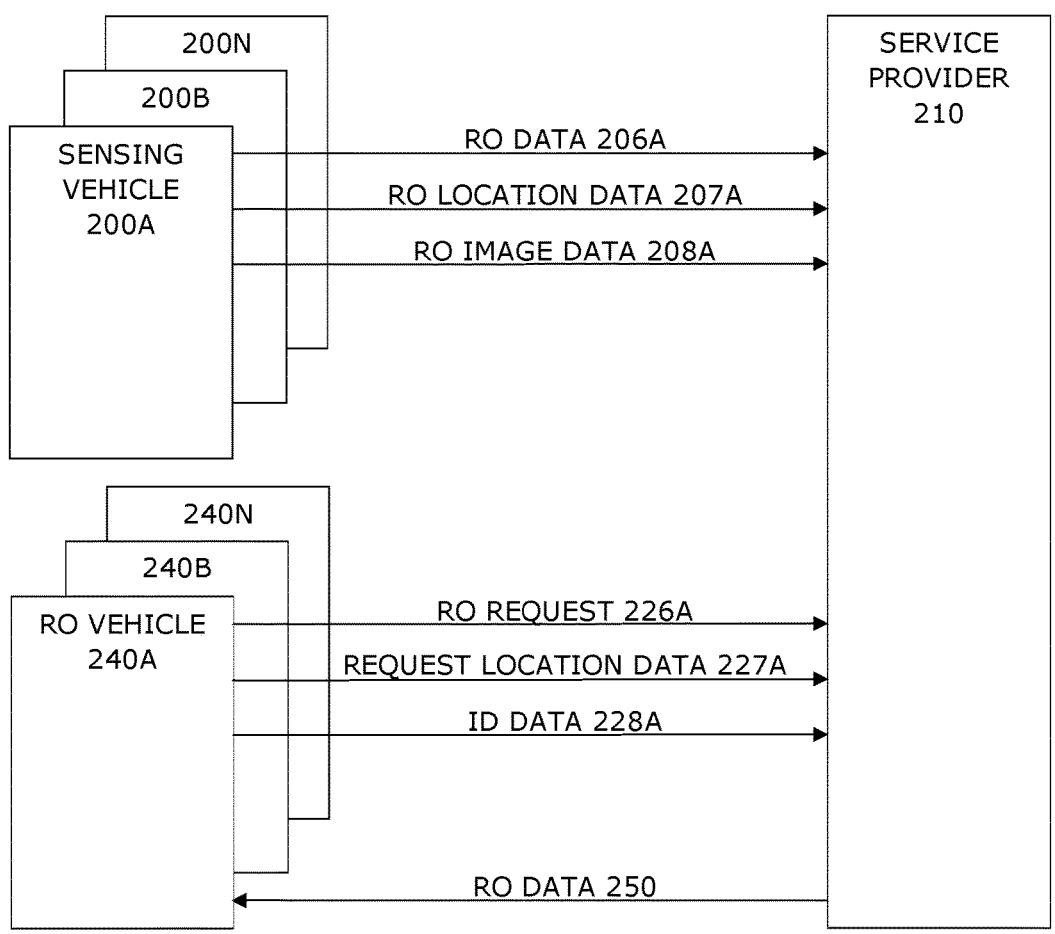
FIG. 7 illustrates schematically a system for detecting and providing road obstacle information.

According to another embodiment, a sensing vehicle may detect road obstacles, such as puddles, ice, oil, teared tire, a stopped vehicle on the shoulder etc. The sensing vehicles sensors may detect the road obstacles in a similar manner to detecting spaces. FIG. 7 illustrates schematically a system for detecting and providing road obstacle information.

With reference to FIG. 7, the sensing vehicles 200A, 200B, . . . , 200N sense road obstacle data (RO data) 206A, which is then transferred to the service provider 210. The road obstacle data 206A is transferred together with road obstacle location data (RO location data) 207A indicating the location of the obstacle and, if available, road obstacle image data (RO image data) 208A. The road obstacle image data 208A may include an identifier, which can be used to associate the road obstacle image data 208A with the road obstacle data 206A. The type of road obstacle image data transferred will depend on the type of sensor(s) present in the sensing vehicle. For example, when one of the sensors provided in the sensing vehicle is a camera or video camera, then the image may be a photograph/still video image of the road obstacle, and/or when one of the sensor(s) provided in the vehicle is a sonar sensor, then the image may be a sonar image of the road obstacle.

The sensing vehicles 200A, 200B, . . . , 200N may sense the road obstacle data 206, the road obstacle location data 207, and, if available, the road obstacle image data 208 in addition to the space data 201, space location data 202, space image data 203, road data 204 and road image data 205 described with reference to FIG. 4. Alternatively, sensing vehicles 200A, 200B, . . . , 200N may sense only road obstacle data 206, the road obstacle location data 207, and, if available, road obstacle image data 208.

Another vehicle, also provided in the network, comprising an obstacle warning system (a RO vehicle) 240A, 240

B, ..., 240N may receive from the service provider 210 notifications of detected road obstacles. The RO vehicle may be a sensing vehicle 200, a requesting vehicle 220, or another vehicle.

Referring to FIG. 7, the RO vehicle 240A, 240B, ..., 240N transfers a request for road obstacle data 226A to the service provider 210. The request 226A may be transferred together with request location data 227A. According to one embodiment the request location data is the current location of the RO vehicle 240A.

The RO vehicle is equipped with an obstacle warning system comprising a processing module, and submits the request for road obstacle data via the obstacle warning system. The obstacle warning system can be built-into the RO vehicles existing navigation system, such as Waze, can be an independent module from the vehicles navigation system, or can be provided in a mobile device, such as a user's mobile phone, which in use is placed in the RO vehicle. In addition, a vehicle may be provided with the parking finder system and the obstacle warning system. The parking finder system and the obstacle warning system may be two distinct systems or may be one system providing both parking space information and/or road obstacle information, as required.

ID data 228A may also be transferred from the RO vehicle 240A to the service provider 210. The ID data 228A may identify the user of the obstacle warning system and/or the RO vehicle. Accordingly, the ID data 228A may comprise RO vehicle ID data and/or user ID data. The ID data 228A may be used by the service provider to determine whether the user and/or RO vehicle is entitled to receive road obstacle data from the service provider.

According to one embodiment, when the RO vehicle is a requesting vehicle, the ID data 228A may comprise the ID data 223A.

The service provider 210 determines whether there are any road obstacles within a predetermined distance Y of the RO vehicles location (as indicated by the RO request location data 227A), and when there is one or more detected road obstacles within the predetermined distance Y of the RO vehicles location, the service provider 210 notifies the RO vehicle of the road obstacle(s) (RO data) 250. The (RO data) 250 may be the same as the RO data 206A provided by the sensing vehicles to the service provider. For example, the RO data 250 may comprise details of the road obstacle, such as the type of road obstacle, the location of the road obstacle and, if available, an image of the road obstacle.

Figure 8:
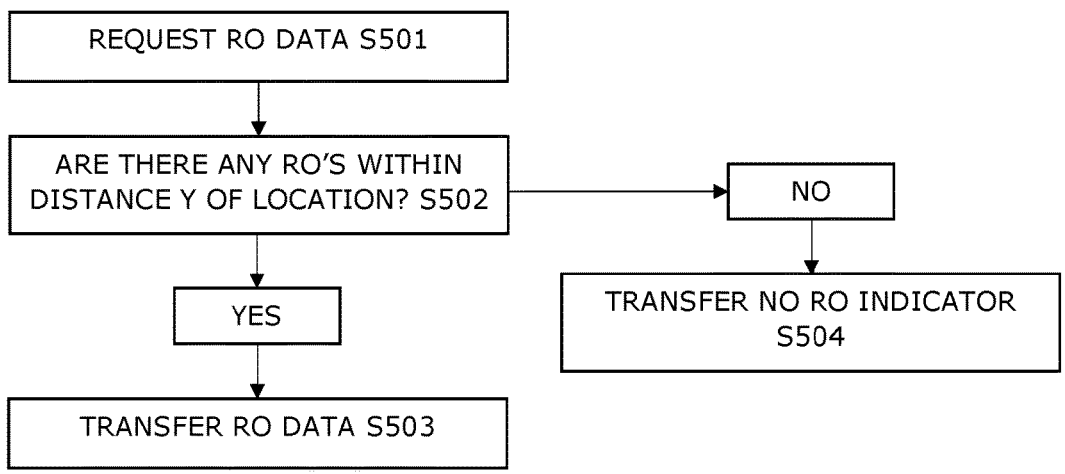
FIG. 8 illustrates a process flow diagram of a method for identifying road obstacles.

FIG. 8 illustrates a process flow diagram of a method for identifying road obstacles. At step S501, a RO vehicle requests road obstacle data. According to one embodiment, the request comprises the RO vehicles ID and the RO vehicles location data. At step S502, the service provider uses the data provided by the plurality of sensing vehicles to determine whether there are any road obstacles within a predetermined distance Y of the RO vehicles location. According to one embodiment, the distance Y may be 0.5 kilometers. However, the predetermined distance Y may be any distance, and the predetermined distance may be set either by the RO vehicle or the service provider.

When there is one or more road obstacles within the predetermined distance Y of the RO vehicles location, the process moves onto step S503. At step S503 the service provider provides the RO vehicle with RO data. When more than one road obstacle is detected within the predetermined distance Y of the RO vehicles location, then the service provider provides a list of road obstacles. The list of road obstacles may be ordered such that the road obstacle nearest to the requesting vehicles location, in terms of distance, is provided at the top of the list.

The RO data can be used to warn the user of the obstacle warning system about the road obstacle, or to signal an autonomous driving system to slow the vehicle when approaching the obstacle.

When there are no road obstacles detected within the predetermined distance Y of the RO vehicles location, the process moves onto step S504. At step S504 the service provider transfers an indication that there are no road obstacles detected to the RO vehicle.

According to one embodiment, the processing module of the RO vehicle is linked to the vehicles navigational system (not illustrated), such that the location of the road obstacle(s) is sent to the vehicles navigation system.

Figure 9:
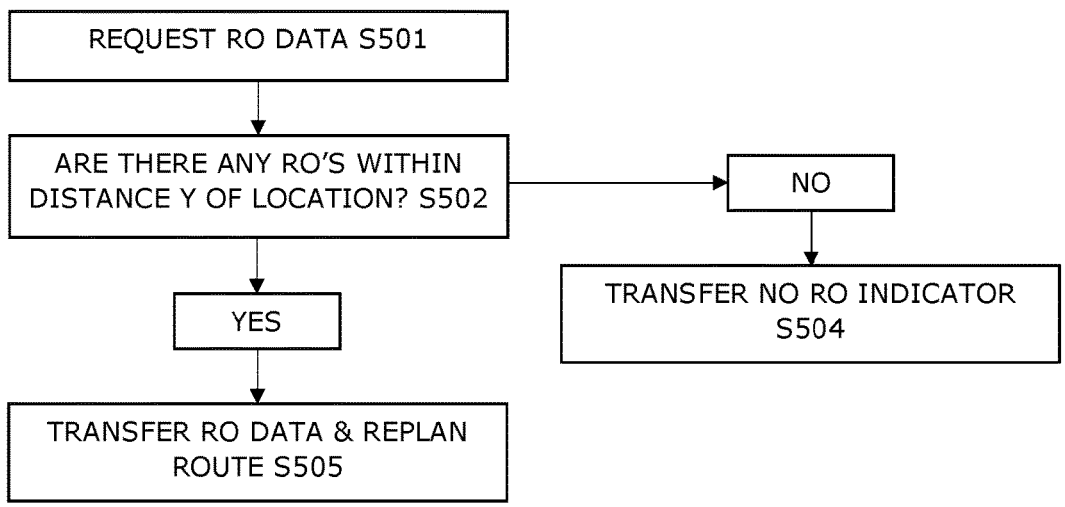
FIG. 9 illustrates a process flow diagram of another method for identifying road obstacles.

FIG. 9 illustrates a process flow diagram of another method for identifying road obstacles. Steps S501, S502 and S504 of FIG. 9 are the same as steps S501, S502 and S504 of FIG. 8. However, the processing module of the obstacle warning system provided at the RO vehicle of FIG. 9 is linked to a navigational system. Therefore, when the RO data is received at the RO vehicle, the navigational system is able to replan the route the RO vehicle is taking in order to avoid the obstacle at step S505.

According to another embodiment, the user of the obstacle warning system is not required to submit a request for road obstacle data, instead the user will receive RO data whenever a road obstacle is detected within the predetermined distance Y of the RO vehicles location as long as the obstacle warning system is activated. In addition, when the obstacle warning system is linked to a navigational system, the navigational system will replan the route of the RO vehicle to avoid road obstacles.

The service provider receives road obstacle data from a plurality of sensing vehicles, continuously, over a network. The received road obstacle data is stored in a database at the service provider together with a time the data was received. According to one embodiment, the data is only kept for a predetermined period of time B, such as 1 hour. After the time period B has elapsed, the data is no longer considered accurate and is removed from the database. According to one embodiment, when information is provided about a road obstacle which is already known, instead of storing the road obstacle data, the time the road obstacle data was received is updated to the current time. The service provider may also apply a weighting factor to the road obstacle data, such that road obstacle data received recently, is considered to be more reliable, and given a higher weighting than road obstacle data received near the end of the predetermined time period. The road obstacle data can then be provided with the weighting to the users of the obstacle warning system.

A sensing vehicle may also function as a requesting vehicle when requesting parking space data and/or a RO vehicle when requesting road obstacle data. In addition, a requesting vehicle may also function as a sensing vehicle when provided with at least one sensor and/or a RO vehicle when requesting road obstacle data. Furthermore, a RO vehicle may also function as a sensing vehicle when provided with at least one sensor and/or a requesting vehicle when requesting parking space data.

According to one embodiment, a mobile device, such as a mobile phone may provide with the hardware and/or software required, such that when the mobile device is provided in a vehicle, the mobile device provides the parking finder system and/or obstacle warning system, and the vehicle functions as a requesting vehicle and/or a RO vehicle respectively. According to a further embodiment, when the mobile device comprises a built-in camera, or other sensor, then when the mobile device is provided in a vehicle, the vehicle functions as a sensing vehicle. A special cradle may be utilised to hold the mobile device at the front of the vehicle, forward facing the road. The camera angle of the mobile device may be increased via optical lens(es).

Figure 10:
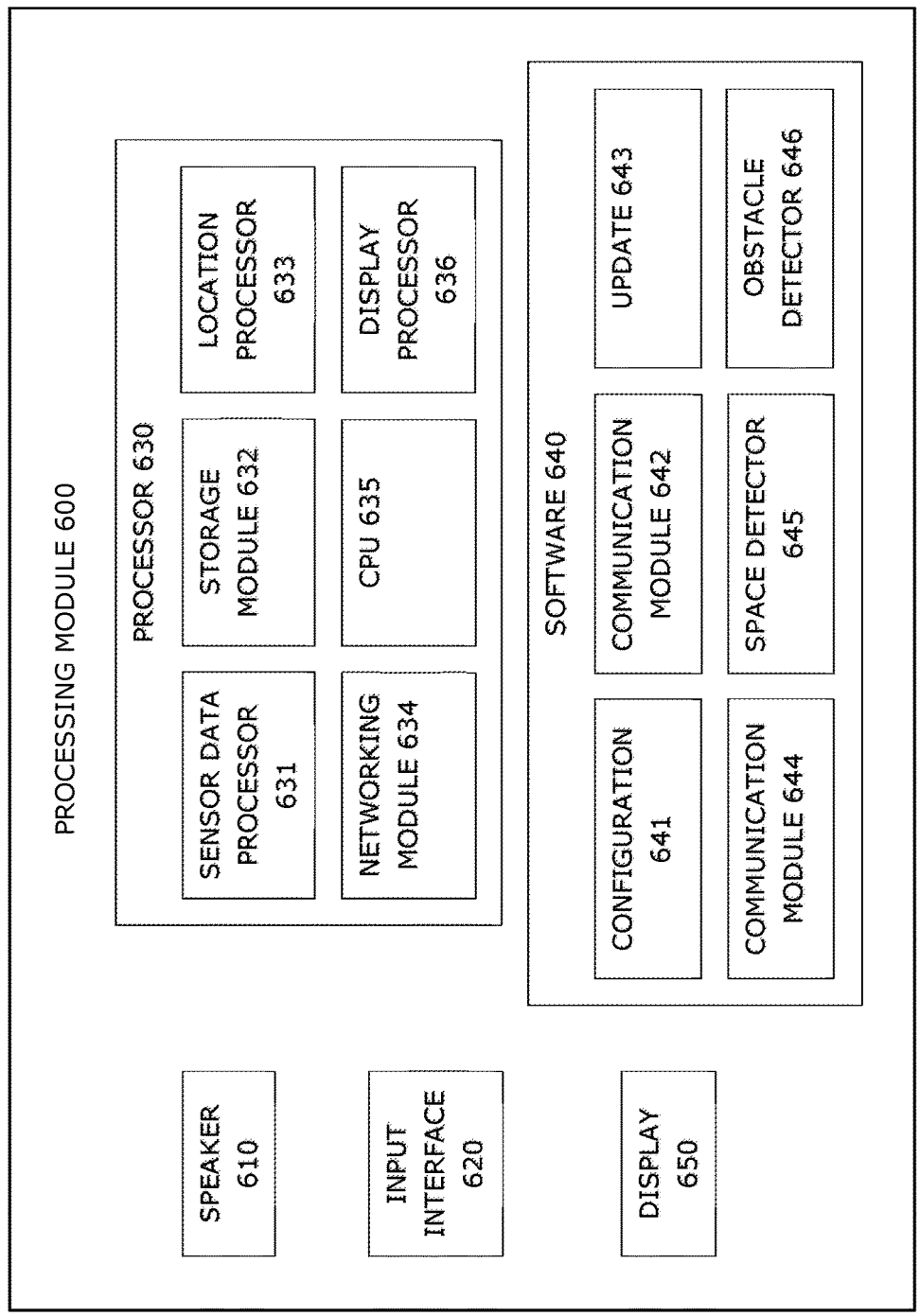
FIG. 10 illustrates schematically a processing module.

FIG. 10 illustrates schematically a processing module 600 which can be utilised by a sensing system. The processing module 600 includes a processor 630, hardware elements, such as the speaker 610, input interface 620 and display 650, and software components 640.

The processor 630 may be individual components, or may be packaged into a single system on chip. The processor 630 comprises a sensor data processor 631 for processing the data sensed by the vehicles sensors; a location processor 633, such as a GPS, for identifying the vehicles location, and calculating the location of a detected space/obstacle; a CPU 635; a storage module 632, a display processor 636; and a networking module 634, such as a 3G/4G/5G cellular module for communication with the service provider. Alternatively, to the networking module 634, the processor 630 may comprise a WiFi/Bluetooth module for establishing connectivity with the service provider via an external component, such as mobile phone or other in car communication system.

The processor may also comprise other modules, as required, which are not illustrated for simplicity.

The software components 640 may comprise an obstacle detector 646 which uses the information fed from the vehicles sensors to detect obstacles on the road, such as open hatches, road closures, dead animals, oil spots, etc.; a space detector 645 which uses information fed from the vehicles sensors to detect spaces. The space detector may also use the information fed from the vehicles sensors to detect parking restrictions and/or permit requirements. Alternatively, a road data detector (not illustrated) may be used to detect parking restrictions and/or permit requirements.

Road data, such as road rules, parking restrictions and permit requirements may be received from the configuration module 641, when this data is provided by an external provider to the configuration module 641. The Road data, parking restrictions and permit requirements may change over time, and therefore may be updated via the update module 643.

As stated above, the road data may be applied at the service provider, rather than at a sensing vehicle, in which case, the processing module may not require a configuration module 641 or an update module 643.

According to another embodiment, the configuration module 641 may provide the road data, which define when a space is suitable as a parking space, such as distance from junction, minimum size etc. as well as obstacle definitions, when the sensing vehicle detects obstacles as well as parking spaces.

The software components 640 may also comprise a communications module 642 for transferring the detected space and/or obstacle data to the service provider, and a communications module for receiving detected space and/or obstacle data from the service provider, detected by other vehicles.

As illustrated in FIG. 10, the processing module 600 may also comprise a speaker 610 for providing audio alert to a user of the parking space/obstacle detection system. For example, audio alert regarding detected obstacles, received from Service provider, when the vehicle is approaching the obstacle. An input interface 620 for activating the parking space location function/obstacle detector function. For example, the interface 620 may be used to transfer a request to the service provider for available parking spaces data within the vicinity of the requesting vehicle, select one of the available parking spaces, and optionally activate navigation software (such as Google Maps or Waze) to provide navigated instructions to the identified parking space. The processing module 600 may also comprise a display 650 for providing visual alert regarding detected obstacles, received from the service provider, when the vehicle is approaching the obstacle, and a list of located available parking spaces etc.

The service provider may also comprise a processing module that includes a processor, hardware elements and software components. The service provider comprises a communications module for receiving space and/or road obstacle data from the sensing vehicles, for receiving a request for parking spaces data and/or RO data from the requesting vehicles and/or RO vehicles, and for transferring the detected space and/or obstacle data to the requesting vehicles and/or RO vehicles.

The service provider processor may comprise a space module which uses information transferred from the sensing vehicles sensors to determine the size of spaces (if not determined at the sensing vehicle), and the suitability of each space for a requesting vehicle. The space data may be stored at the space module, or at another storage module. The service provider processor may also comprise a road data module which use the information fed from the vehicles sensors to determine parking restrictions and/or permit requirements, and the relevance of the road data to each detected space (if at all). The road data may be stored at the road module, or at another storage module. When the road data, such as road rules, parking restrictions and permit requirements, is received from an external provider, then the data may be stored in the road data module, or at another storage module. The service provider processor also comprises an update module for receiving updates to the road data, parking restrictions and permit requirements, which again may be stored in the road data module, or at another storage module.

The service provider processor may also comprise a road obstacle module which uses information transferred from the sensing vehicles sensors to determine the whether a road obstacle is near a RO vehicle. As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the vehicles computer, such as the sensing vehicles computer, the requesting vehicles computer and/or the RO vehicles computer, partly on the vehicles computer and partly on the remote computer or entirely on the remote computer or server. In the latter scenario, the remote computer may be connected to the vehicles computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a machine implemented method of identifying parking spaces for vehicles. By detecting road data as well as space information the accuracy of the determination of whether a space is a parking space can be increased.

In embodiments, said space location is detected by a location system provided in said vehicle.

In embodiments, said at least one sensor comprises a front sensor.

In embodiments, said front sensor comprises a broad angle front sensor.

In embodiments, said at least one sensor comprises side sensors.

In embodiments, said at least one sensor comprises a rear sensor.

In embodiments, said at least one sensor comprises one or more of a camera, a video camera, an infrared sensor, a sonar sensor, a laser etc.

In embodiments, said road data comprises one or more of: signs indicating parking restrictions; signs indicating required parking permits; fire hydrants; parking gates; markings provided on the road and/or side walk; the colour of markings provided on the road and/or side walk; pedestrian crossings marked on the road; distance of a detected space from road junctions.

In embodiments, obtaining said road data for said space location comprises obtaining said road data from a third party.

In embodiments, obtaining said road data for said space location comprises: detecting said road data, said road data being detected by said at least one sensor provided at said sensing vehicle; and transferring said detected road data to said remote processing module.

In embodiments, said method further comprises: determining a parking space tariff from said road data said tariff data determination being performed by said processor remote from said vehicle; and associating said parking space tariff with said parking space.

In embodiments, said method further comprises: determining a size of said detected space; determining whether said size of said detected space is greater than or equal to a predetermined minimum space size; when it is determined that said size of said detected space is less than said predetermined minimum space size, determining that said detected space is not a parking space; and when it is determined that said size of said detected space is greater than or equal to said predetermined minimum space size, determining that said detected space is a parking space. By determining a minimum size below which a space is not considered a parking space, prevents the identification of spaces which are too small to be parking spaces, increasing the accuracy of the system.

In embodiments, said detected space size determination is performed by a processor provided at said vehicle. The sensing vehicle determines when a space is smaller than the minimum, and the spaces which are smaller than the minimum are not transferred to the service provider as parking spaces, thereby reducing the amount of data which is transferred.

In embodiments, said detected space size determination is performed by said processor provided at said remote server. The service provider determines when a space is smaller than the minimum, thereby reducing the amount of computations which are to be performed at the vehicle.

In embodiments, said method further comprises: receiving at said remote processing module a parking space request together with a location request from a requesting vehicle; determining whether one or more of said detected parking spaces are within a predetermined distance of said location request, said parking space determination being performed by said remote processor; and when one or more of said detected parking spaces are within said predetermined distance of said location request, transferring said one or more detected parking space locations from said remote processing module to a vehicle processor provided at said requesting vehicle. By providing parking space information to requesting vehicles, the amount of time spent by the requesting vehicles looking for parking spaces can be reduced. In addition, reducing the amount of time spent looking for looking for parking spaces reduces congestion on roads and decreases pollution.

In embodiments, said location request comprises a location of said requesting vehicle.

In embodiments, said location request comprises a location said requesting vehicle requires said parking space.

In embodiments, said method further comprises: transferring a detected parking space image to said requesting vehicle together with said one or more detected parking space locations.

In embodiments, said method further comprises: receiving a requestor identifier from said requesting vehicle; and determining whether said requesting vehicle is entitled to receive said one or more detected parking space locations based on said requestor identifier.

In embodiments, said method further comprises: receiving at said remote processing module parking permit data from said requesting vehicle; determining whether said parking permit data indicates parking permissions which allow parking at said detected space, said parking permit determination being performed by said remote processor; and when it is determined that said parking permit data indicates parking permissions which allow parking at said space, determining that said detected space is a parking space for said requesting vehicle. By considering user parking permit data, the accuracy of the determination of whether a space is a parking space for the user can be improved.

In embodiments, said parking permit data comprises one or more of: a residence parking permit, an employee parking permit, a disabled parking permit.

In embodiments, said method further comprises: determining at said remote processing module a size of said requesting vehicle; determining a size of said parking space; and wherein determining whether one or more of said detected parking spaces are within a predetermined distance of said location request further comprises: determining whether said size of said detected parking space is greater than said size of said requesting vehicle; when it is determined that said size of said detected parking space is less than said size of said requesting vehicle, determining that said detected parking space is not a parking space for said requesting vehicle; and when it is determined that said size of said detected parking space is greater than said size of said requesting vehicle, determining that said detected parking space is a parking space for said requesting vehicle. By considering the size of the requesting vehicle, the accuracy of the determination of whether a space is a parking space for the requesting vehicle can be improved.

In embodiments, said method further comprises: receiving requesting vehicle data from said requesting vehicle, and determining said size of said requesting vehicle from said requesting vehicle data.

In embodiments, determining said size of said requesting vehicle comprises obtaining said size of said requesting vehicle from a third party.

In embodiments, said method further comprises: when none of said detected parking spaces are within said predetermined distance of said location request; increasing said predetermined distance of said location request, wherein said remote processor increases said predetermined distance; determining whether one or more of said detected parking spaces are within said increased predetermined distance of said location request; and when one or more of said detected parking spaces are within said increased predetermined distance of said location request, transferring said one or more detected parking space locations to said vehicle processor provided at said requesting vehicle.

In embodiments, said method further comprises: transferring from said remote processing module, said one or more detected parking space locations as a list to said vehicle processor provided at said requesting vehicle.

In embodiments, said list of detected parking space locations are prioritised according to: distance from said location request to said detected parking space location; driving time from said location request to said detected parking space location; time passed since said detected parking space was detected; parking restrictions applicable to said detected parking space; parking permits applicable to said detected parking space. By providing a list of available spaces to the requesting vehicle, the requesting vehicle can select which space is desires to park in.

In embodiments, said method further comprises: associating a parking space tariff with said detected parking space at said remote processing module; and transferring said one or more detected parking space locations together with said associated parking space tariff to said vehicle processor provided at said requesting vehicle.

In embodiments, said parking space tariff for said detected parking space is obtained from a third party.

In embodiments, said parking space tariff for said detected parking space is determined from said road data.

In embodiments, said method further comprises: selecting at said vehicle processor one of said one or more detected parking space locations; and navigating from said location request to said selected parking space location, wherein said location processor provided at said vehicle determines said navigation.

In embodiments, said method further comprises: detecting a road obstacle and a road obstacle location, said road obstacle being detected by said at least one sensor provided in said vehicle and said road obstacle location being detected by said location processor provided at said sensing vehicle.

In embodiments, said at least one sensor provided at said vehicle comprises at least one sensor provided in a mobile device provided at said vehicle.

In embodiments, said method further comprises: detecting a road obstacle and a road obstacle location, said road obstacle being detected by said at least one sensor provided at said sensing vehicle and said road obstacle location being detected by a location processor provided at said sensing vehicle; transferring data regarding said road obstacle and said road obstacle location to a processing module remote from said sensing vehicle; receiving at said remote processing module a road obstacle request together with a road obstacle location request from said requesting vehicle; determining whether one or more of said detected road obstacles are within said predetermined distance of said road obstacle location request; and when one or more of said detected road obstacles are within said predetermined distance of said road obstacle location request, transferring said one or more road obstacle locations to said requesting vehicle. By detecting road obstacles, the system can be used to warn vehicles of obstacles, so that the vehicle can either replan a route around the obstacle of slow down, reducing congestion.

In embodiments, said method further comprises: detecting a plurality of said spaces and said space locations, said plurality of said spaces and said space locations being detected by a plurality of sensing vehicles dispersed across a network.

In embodiments, said road obstacle comprises one or more of: puddles, ice, oil, teared tire, a stopped vehicle on the road.

In embodiments, said method further comprises: receiving a requestor identifier from said requesting vehicle; and determining whether said requesting vehicle is entitled to receive said one or more detected road obstacle locations based on said requestor identifier.

In embodiments, said method further comprises: navigating said requesting vehicle to avoid said one or more detected road obstacle locations, wherein a location processor provided at said requesting vehicle determines said navigation.

The invention claimed is:

1. A machine implemented method of identifying parking spaces for vehicles, said method comprising:
   detecting a space and a space location, said space being detected by at least one sensor provided at a sensing vehicle and said space location being detected by a location processor provided at said sensing vehicle;
   transferring said detected space location to a processing module remote from said vehicle;
   obtaining road data for said space location, said road data indicative of one or more parking restrictions;
   determining whether said road data indicates parking restrictions which prevent parking at said detected space location;
   when it is determined that said road data indicates parking restrictions which prevent parking at said space location, determining that said detected space is not a parking space; and
   when it is determined that said road data indicates parking restrictions which do not prevent parking at said space location, determining that said detected space is a parking space, said determinations being performed by a processor provided at said remote processing module; said method further comprising:
   detecting said road data, said road data being detected by said at least one sensor provided at a sensing vehicle, and transferring said detected road data together with location data indicating the location of the detected road data to said processing module remote from said vehicle; and
   determining a size of said detected space at said sensing vehicle and transferring said size of said detected space to said processing module remote from said vehicle.

2. The method of claim 1, wherein obtaining said road data for said space location comprises obtaining said road data from a third party.

3. The method of claim 1, further comprising:
   determining a parking space tariff from said road data said tariff data determination being performed by said processor remote from said vehicle; and
   associating said parking space tariff with said parking space.

4. The method of claim 1, further comprising:
   determining whether said size of said detected space is greater than or equal to a predetermined minimum space size;
   when it is determined that said size of said detected space is less than said predetermined minimum space size, determining that said detected space is not a parking space; and
   when it is determined that said size of said detected space is greater than or equal to said predetermined minimum space size, determining that said detected space is a parking space.

5. The method of claim 1, further comprising:
   receiving at said remote processing module a parking space request together with a location request from a requesting vehicle;
   determining whether one or more of said detected parking spaces are within a predetermined distance of said location request, said parking space determination being performed by said remote processor; and
   when one or more of said detected parking spaces are within said predetermined distance of said location request, transferring said one or more detected parking space locations from said remote processing module to a vehicle processor provided at said requesting vehicle.

6. The method of claim 5, further comprising:
   receiving at said remote processing module parking permit data from said requesting vehicle;
   determining whether said parking permit data indicates parking permissions which allow parking at said detected space, said parking permit determination being performed by said remote processor; and
   when it is determined that said parking permit data indicates parking permissions which allow parking at said space, determining that said detected space is a parking space for said requesting vehicle.

7. The method of claim 5, further comprising:
   determining at said remote processing module a size of said requesting vehicle;
   determining a size of said parking space; and wherein determining whether one or more of said detected parking spaces are within a predetermined distance of said location request further comprises:
      determining whether said size of said detected parking space is greater than said size of said requesting vehicle;
      when it is determined that said size of said detected parking space is less than said size of said requesting vehicle, determining that said detected parking space is not a parking space for said requesting vehicle; and
      when it is determined that said size of said detected parking space is greater than said size of said requesting vehicle, determining that said detected parking space is a parking space for said requesting vehicle.

8. The method of claim 5, further comprising:
   when none of said detected parking spaces are within said predetermined distance of said location request;
   increasing said predetermined distance of said location request, wherein said remote processor increases said predetermined distance;
   determining whether one or more of said detected parking spaces are within said increased predetermined distance of said location request; and
   when one or more of said detected parking spaces are within said increased predetermined distance of said location request, transferring said one or more detected parking space locations to said vehicle processor provided at said requesting vehicle.

9. The method of claim 5, further comprising:
   transferring from said remote processing module, said one or more detected parking space locations as a list to said vehicle processor provided at said requesting vehicle.

10. The method of claim 5, further comprising:
   associating a parking space tariff with said detected parking space at said remote processing module; and
   transferring said one or more detected parking space locations together with said associated parking space tariff to said vehicle processor provided at said requesting vehicle.

11. The method of claim 5, further comprising:
selecting at said vehicle processor one of said one or more detected parking space locations; and
navigating from said location request to said selected parking space location, wherein said location processor provided at said vehicle determines said navigation.

12. The method of claim 1, further comprising:
detecting a road obstacle and a road obstacle location, said road obstacle being detected by said at least one sensor provided in said vehicle and said road obstacle location being detected by said location processor provided at said sensing vehicle.

13. The method of claim 1, wherein said at least one sensor provided at said vehicle comprises at least one sensor provided in a mobile device provided at said vehicle.

14. The method of claim 1, further comprising:
detecting a road obstacle and a road obstacle location, said road obstacle being detected by said at least one sensor provided at said sensing vehicle and said road obstacle location being detected by a location processor provided at said sensing vehicle;
transferring data regarding said road obstacle and said road obstacle location to a processing module remote from said sensing vehicle;
receiving at said remote processing module a road obstacle request together with a road obstacle location request from said requesting vehicle;
determining whether one or more of said detected road obstacles are within said predetermined distance of said road obstacle location request; and
when one or more of said detected road obstacles are within said predetermined distance of said road obstacle location request, transferring said one or more road obstacle locations to said requesting vehicle.

15. The method of claim 1, further comprising:
detecting a plurality of said spaces and said space locations, said plurality of said spaces and said space locations being detected by a plurality of sensing vehicles dispersed across a network.

16. A system for identifying parking spaces for vehicles, said system comprising:
a plurality of sensing vehicles, each said sensing vehicle provided with at least one vehicle sensor, said at least one vehicle sensor configured to detect a space and a space location;
a remote processing module configured to receive said detected space and said space location from said plurality of sensing vehicles, and to obtain road data for said space location, said road data indicative of one or more parking restrictions; and
a plurality of requesting vehicles configured to transfer a parking space request together with a location request to said processing module, and to receive one or more of said detected parking space locations from said processing module when one or more of said detected parking space locations are within a predetermined distance of said location request;
wherein said at least one vehicle sensor provided at each said sensing vehicle is further configured to detect said road data, and transfers said detected road data together with location data indicating the location of the detected road data to said remote processing module; and
wherein each said sensing vehicle determines a size of said detected space and transfers said size of said detected space to said remote processing module.

* * * * *